US012059695B2

(12) United States Patent
Oetken et al.

(10) Patent No.: US 12,059,695 B2
(45) Date of Patent: Aug. 13, 2024

(54) FLUID SPRAY SYSTEM TIMING CONTROL

(71) Applicant: Caterpillar Paving Products Inc., Brooklyn Park, MN (US)

(72) Inventors: Nicholas A Oetken, Brooklyn Park, MN (US); Paul Petersen, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 113 days.

(21) Appl. No.: 17/447,879

(22) Filed: Sep. 16, 2021

(65) Prior Publication Data

US 2023/0078995 A1 Mar. 16, 2023

(51) Int. Cl.

| | |
|---|---|
| ***B05B 12/02*** | (2006.01) |
| ***B05B 12/00*** | (2018.01) |
| ***E01C 19/17*** | (2006.01) |

(52) U.S. Cl.

CPC ............ *B05B 12/02* (2013.01); *B05B 12/004* (2013.01); *E01C 19/174* (2013.01); *E01C 19/176* (2013.01)

(58) Field of Classification Search

CPC ..... B05B 12/02; B05B 12/004; B05B 13/005; E01C 19/174; E01C 19/238

See application file for complete search history.

(56) References Cited

U.S. PATENT DOCUMENTS

| | | | | |
|---|---|---|---|---|
| 6,385,421 | B1 * | 5/2002 | Imamiya | G03G 15/11 399/237 |
| 6,827,524 | B2 * | 12/2004 | Starry, Jr. | E01C 19/238 404/129 |
| 8,500,363 | B1 * | 8/2013 | Ries | E01C 19/264 404/104 |
| 8,636,443 | B2 * | 1/2014 | Ries | E01C 19/238 404/129 |
| 9,422,675 | B2 * | 8/2016 | Bornemann | E01C 19/238 |
| 9,492,834 | B1 * | 11/2016 | Bishel | B05B 17/08 |
| 9,512,575 | B2 * | 12/2016 | Bornemann | E01C 19/23 |
| 9,764,343 | B2 * | 9/2017 | Schroeder | E01C 23/22 |
| 10,006,175 | B2 * | 6/2018 | Bornemann | E01C 19/26 |
| 10,196,791 | B1 * | 2/2019 | Oetken | E02F 9/2037 |
| 10,407,924 | B1 * | 9/2019 | Johnson | E01C 19/174 |
| 10,669,676 | B2 * | 6/2020 | Laugwitz | E01C 19/26 |
| 2004/0018053 | A1 * | 1/2004 | Starry, Jr. | E01C 19/238 404/129 |

(Continued)

FOREIGN PATENT DOCUMENTS

| | | |
|---|---|---|
| CN | 103628392 A | 3/2014 |
| CN | 104452543 A | 3/2015 |

*Primary Examiner* — Joseph A Greenlund

(57) ABSTRACT

In some implementations, a controller may receive an input that indicates a proportion of a spray cycle in which a fluid spray system is to be active. The fluid spray system may include at least a first fluid pump configured to supply fluid to a first fluid spray bar and a second fluid pump configured to supply fluid to a second fluid spray bar. The controller may determine, in accordance with the proportion, a spraying timing for the first fluid pump and the second fluid pump that minimizes an overlap of an active time of the first fluid pump and an active time of the second fluid pump, and/or an overlap of an inactive time of the first fluid pump and an inactive time of the second fluid pump. The controller may cause activation of the first fluid pump and the second fluid pump in accordance with the spraying timing.

20 Claims, 4 Drawing Sheets

(56) References Cited

U.S. PATENT DOCUMENTS

| | | | | |
|---|---|---|---|---|
| 2008/0193215 | A1* | 8/2008 | Rath | B05B 1/202 239/159 |
| 2010/0327073 | A1* | 12/2010 | Kette | B05B 17/08 239/8 |
| 2013/0053444 | A1* | 2/2013 | Brittain | A61P 37/08 514/562 |
| 2013/0223933 | A1* | 8/2013 | Ries | E01C 19/238 222/1 |
| 2016/0053444 | A1* | 2/2016 | Bornemann | B05B 13/005 404/128 |
| 2016/0265520 | A1* | 9/2016 | Skinner, Jr. | F04B 49/065 |
| 2016/0326701 | A1* | 11/2016 | Schlenker | E01C 23/065 |
| 2017/0232464 | A1* | 8/2017 | Fuller | B05B 12/02 239/18 |
| 2017/0356141 | A1* | 12/2017 | Berg | E01C 19/4813 |
| 2018/0128439 | A1* | 5/2018 | Bruls | B05B 17/08 |
| 2019/0211516 | A1* | 7/2019 | Laugwitz | E01C 19/26 |
| 2020/0115861 | A1* | 4/2020 | Thiesse | E01C 19/21 |
| 2021/0140126 | A1* | 5/2021 | Burger | E01C 19/238 |
| 2022/0341544 | A1* | 10/2022 | Icard | F17C 5/00 |
| 2022/0341554 | A1* | 10/2022 | Xu | F21S 9/037 |
| 2023/0078995 | A1* | 3/2023 | Oetken | B05B 12/02 239/70 |
| 2023/0244155 | A1* | 8/2023 | Murakami | G03G 15/0872 399/262 |

* cited by examiner

FLUID SPRAY SYSTEM TIMING CONTROL

TECHNICAL FIELD

The present disclosure relates generally to a fluid spray system and, for example, to timing control for a fluid spray system.

BACKGROUND

Compaction of a surface material, such as soil or asphalt, can improve strength and stability of the surface. In a paving context, a paving machine distributes hot paving material, such as asphalt, over a surface, and a mobile compactor machine follows the paving machine to compact the material to a desired density and obtain an acceptable surface finish. Commonly, the compactor machine may include one or more compaction drums that serve to propel the compactor machine and compact the paving material via the weight of the compactor machine. During compaction, paving material, such as asphalt, may stick to a compaction drum, which can be detrimental to compaction performance.

Accordingly, the compactor machine may employ a fluid spray system that includes a fluid pump to spray fluid, such as water, via a fluid spray bar onto the one or more compaction drums to prevent sticking of paving material. In some examples, the fluid spray system may include multiple fluid pumps to respectively control fluid spray via multiple fluid spray bars onto a single compaction drum. Moreover, the multiple fluid pumps may cause fluid to be sprayed from the multiple fluid spray bars continuously or the multiple fluid pumps may activate only for a particular proportion of a spray cycle (e.g., to conserve fluid usage). In the latter case, the multiple fluid pumps may be simultaneously active for the proportion of the spray cycle and simultaneously inactive for a remainder of the spray cycle. When the multiple fluid pumps are simultaneously active, excessive fluid is sprayed from the multiple fluid spray bars, thereby wasting the fluid. Moreover, when the multiple fluid pumps are simultaneously inactive, no fluid is sprayed from the multiple fluid spray bars, thereby allowing paving material to stick to the compaction drum.

China Patent No. 103628392 (the '392 patent) discloses a sprinkling control device for a road roller. The '392 patent discloses controlling a first water pump to spray water alone, a second water pump to spray water alone, or the first water pump and the second water pump to spray water alternately. Moreover, the '392 patent states that when the two water pumps sprinkle water alternately, one of the two water pumps can be connected to a power supply line to realize the water pump sprinkling.

While the two pumps of the '392 patent can alternately cause spraying through a single outlet, the two pumps of the '392 patent are not configured for causing simultaneous spraying through respective outlets. Thus, the '392 patent does not relate to a fluid spray system that includes multiple fluid pumps to respectively control fluid spray via multiple fluid spray bars onto a single compaction drum. Accordingly, the '392 patent does not address excessive fluid use resulting from simultaneous activation of the multiple fluid pumps, or the sticking of paving material to the compaction drum resulting from simultaneous inactivation of the multiple fluid pumps.

The fluid spray system of the present disclosure solves one or more of the problems set forth above and/or other problems in the art.

SUMMARY

A fluid spray system may include a first fluid spray bar; a second fluid spray bar; a first fluid pump configured to supply fluid to the first fluid spray bar; a second fluid pump configured to supply fluid to the second fluid spray bar; and a controller configured to: determine a spraying timing for the first fluid pump and the second fluid pump that minimizes at least one of: an overlap of an active time of the first fluid pump and an active time of the second fluid pump, or an overlap of an inactive time of the first fluid pump and an inactive time of the second fluid pump; and cause activation of the first fluid pump and the second fluid pump in accordance with the spraying timing.

A compactor machine may include a compaction member; a fluid spray system, that may include a first fluid spray bar configured to direct fluid at the compaction member, a second fluid spray bar configured to direct fluid at the compaction member, a first fluid pump configured to supply fluid to the first fluid spray bar, and a second fluid pump configured to supply fluid to the second fluid spray bar; and a controller configured to: cause activation of the first fluid pump and the second fluid pump in accordance with a spraying timing that minimizes at least one of: an overlap of an active time of the first fluid pump and an active time of the second fluid pump, or an overlap of an inactive time of the first fluid pump and an inactive time of the second fluid pump.

A method may include receiving an input relating to a fluid spray system that indicates a proportion of a spray cycle in which the fluid spray system is to be active, the fluid spray system including at least a first fluid pump configured to supply fluid to a first fluid spray bar and a second fluid pump configured to supply fluid to a second fluid spray bar; determining, in accordance with the proportion, a spraying timing for the first fluid pump and the second fluid pump that minimizes at least one of: an overlap of an active time of the first fluid pump and an active time of the second fluid pump, or an overlap of an inactive time of the first fluid pump and an inactive time of the second fluid pump; and causing activation of the first fluid pump and the second fluid pump in accordance with the spraying timing.

DETAILED DESCRIPTION

This disclosure relates to a fluid spray system, which is applicable to any machine that utilizes fluid spraying, such as a machine that utilizes multiple fluid spray bars.

Figure 1:
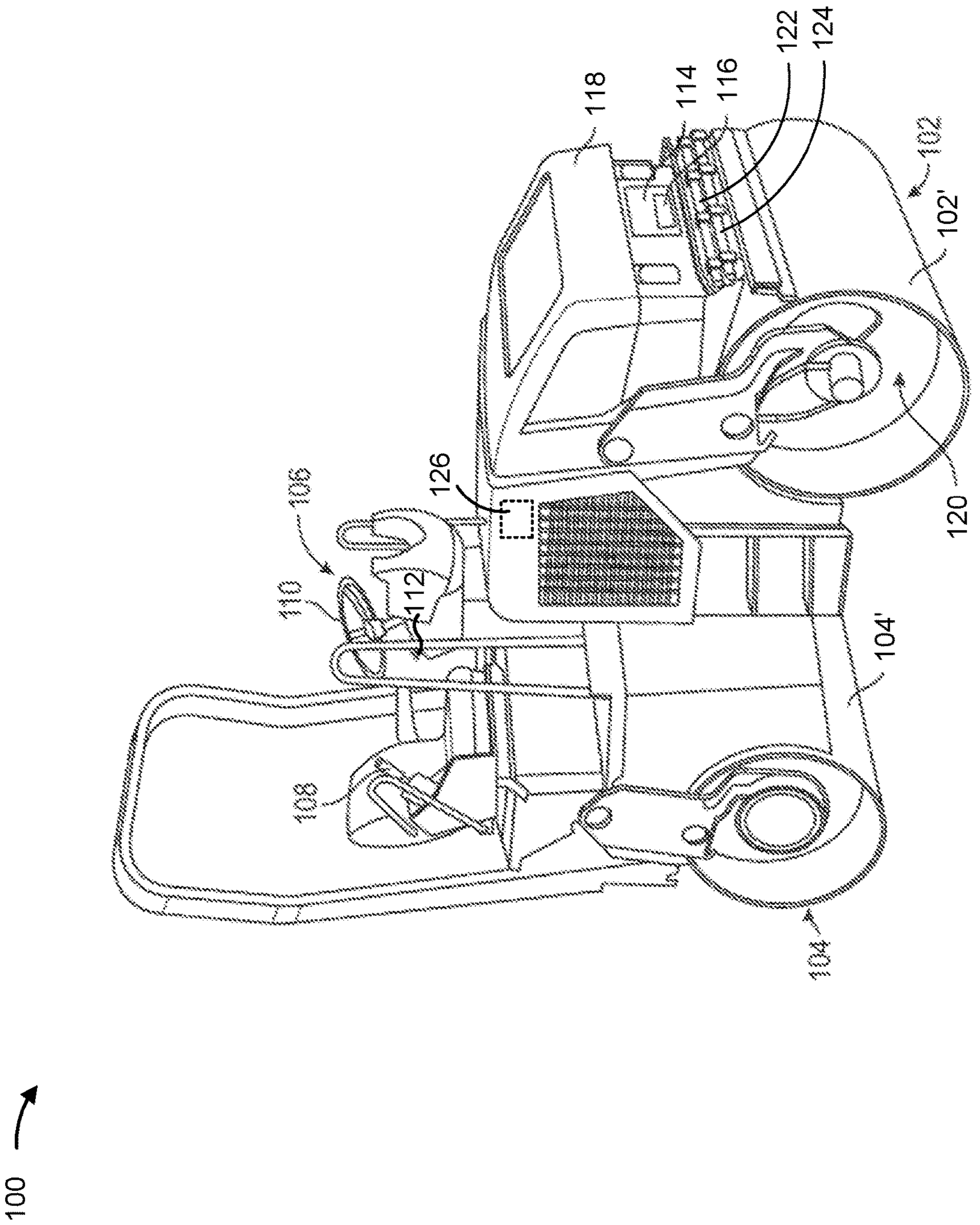
FIG. 1 is a diagram of an example machine described herein.

FIG. 1 is a diagram of an example machine 100 described herein. While in FIG. 1 the machine 100 is depicted as a compactor machine, the machine 100 may be another type of machine. The machine 100 may be an asphalt compactor machine (e.g., a self-propelled, double-drum compactor machine), a vibratory drum compactor machine, or the like, which may be used to compact various materials, such as soil and/or asphalt, among other examples.

The machine 100 has at least one compaction member, such as a compaction drum. For example, as shown, the machine 100 has a front compaction drum 102 and a back compaction drum 104. The compaction drums 102, 104 provide ground engagement of the machine 100 at surfaces 102', 104' of the compaction drums 102, 104, respectively. The surfaces 102', 104' may include cylindrical surfaces that form exteriors of shells of the compaction drums 102, 104, respectively. As the machine 100 passes over a mat of paving material, the surfaces 102', 104' roll against the paving material and provide compaction forces to the paving material due to a weight of the machine 100. In some examples, the machine 100 may include one or more other ground engagement members, such as one or more wheels and/or one or more tracks, in addition or alternatively to the front compaction drum 102 or the back compaction drum 104.

The machine 100 includes an operator station 106 equipped with various systems and/or mechanisms for control of the operation of the machine 100. For example, the operator station 106 may include a drive system control 108 (shown as a shift lever) and/or a steering system control 110 (shown as a steering wheel). In addition, the operator station 106 may include a fluid spray system control 112. The fluid spray system control 112 enables an operator, or other user, of the machine 100 to indicate a proportion of a spray cycle in which a fluid spray system (e.g., fluid spray system 200, described below) of the machine 100 is to be active (e.g., as a percentage, as a time, or the like). The fluid spray system control 112 may include a dial, a knob, a lever, and/or a touchscreen interface.

The machine 100 includes an engine 114 and a generator 116 coupled with the engine 114. The engine 114 and the generator 116 are attached to a frame 118 of the machine 100. The generator 116 may serve as an electrical power source for various onboard systems and components of the machine 100. The engine 114 may include any type of engine (e.g., internal combustion, gas, diesel, gaseous fuel, natural gas, propane, or the like). The engine 114 is configured to drive movement of the machine 100 (e.g., via compaction drums 102, 104) and other components of the machine 100, such as the generator 116. In some examples, the engine 114 may include an electric motor. The machine 100 also includes a braking system 120 configured to receive operator input to decrease or arrest a speed of the machine 100.

The machine 100 includes at least one fluid spray bar. A fluid spray bar may include one or more nozzles for spraying fluid (e.g., water) and a conduit with a fluid passageway that supplies fluid to the one or more nozzles. As shown, the machine 100 includes a first fluid spray bar 122 and a second fluid spray bar 124. The fluid spray bars 122, 124 are part of the fluid spray system 200, described in connection with FIG. 2. The fluid spray bars 122, 124 may be configured to direct fluid (e.g., water) at the surface 102' of the compaction drum 102. The machine 100 additionally or alternatively may include fluid spray bars (not shown) that direct fluid at the surface 104' of the compaction drum 104.

The machine 100 includes a controller 126 (e.g., an electronic control module (ECM)). The controller 126 may include one or more memories and/or one or more processors that implement various operations of the machine 100, such as fluid spraying operations described in connection with FIG. 2. The controller 126 may be communicatively connected to one or more systems of the machine 100. In some implementations, the controller 126 may provide autonomous control of one or more systems of the machine 100 (e.g., autonomous propulsion, steering, and/or braking). The controller 126 may be communicatively connected to a fluid spray system 200 of the machine 100, and may provide control of the fluid spray system 200, as described in connection with FIG. 2.

As indicated above, FIG. 1 is provided as an example. Other examples may differ from what is described in connection with FIG. 1.

Figure 2:
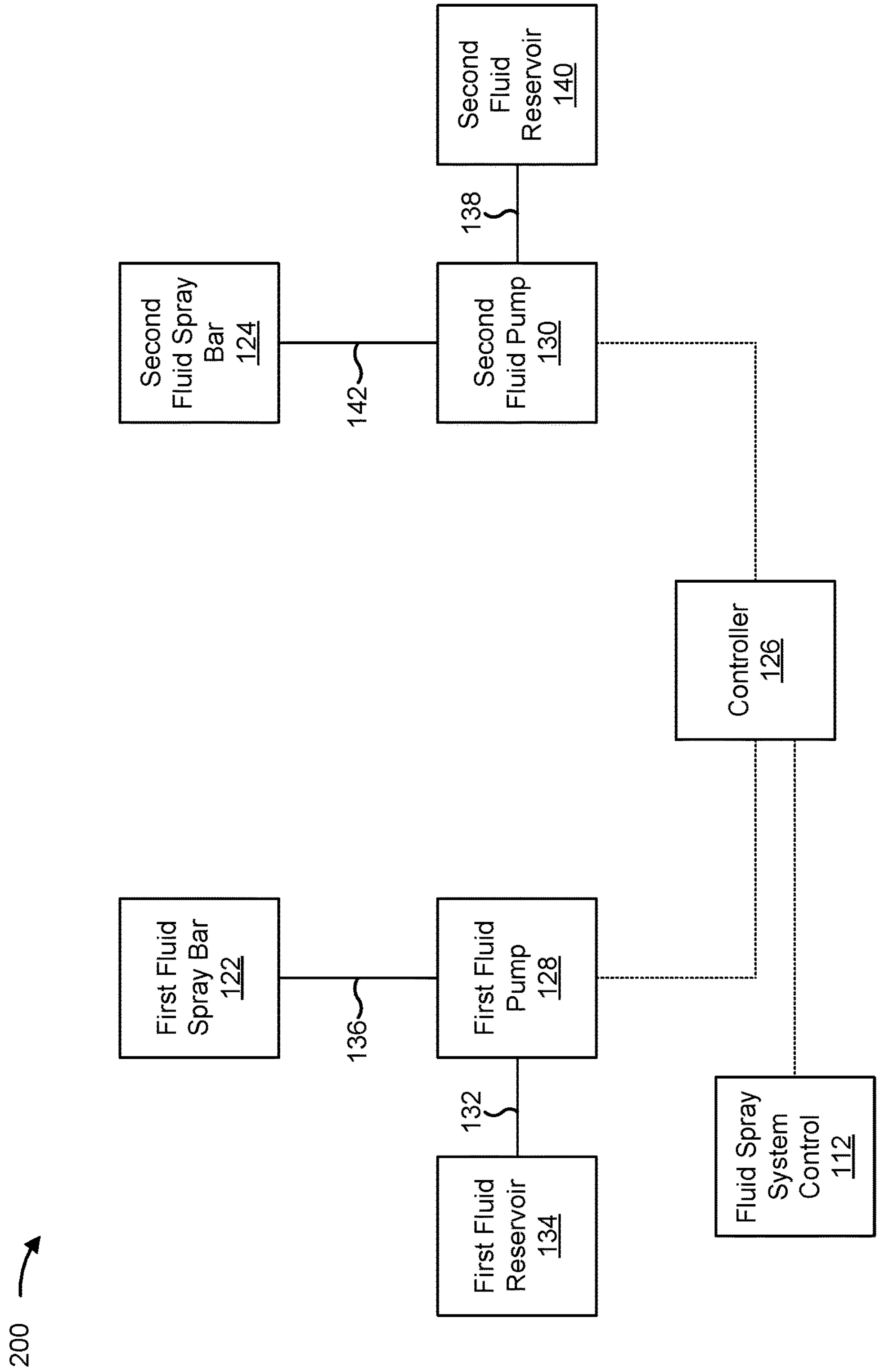
FIG. 2 is a diagram of an example fluid spray system described herein.

FIG. 2 is a diagram of a fluid spray system 200 described herein. As shown, the fluid spray system 200 includes the first fluid spray bar 122 and the second fluid spray bar 124. The first fluid spray bar 122 is fluidly connected to a first fluid pump 128, and the second fluid spray bar 124 is fluidly connected to a second fluid pump 130. As described above, the first fluid spray bar 122 and the second fluid spray bar 124 may be configured to direct fluid at the same compaction member of the machine 100 (e.g., front compaction drum 102). In some examples, the fluid spray system 200 may include a third fluid spray bar (not shown) and a fourth fluid spray bar (not shown) configured to direct fluid at another compaction member of the machine 100 (e.g., back compaction drum 104). The third fluid spray bar may be fluidly connected to the first fluid pump 128 and the fourth fluid spray bar may be fluidly connected to the second fluid pump 130. Thus, control of the first fluid spray bar 122 by the first fluid pump 128, as described herein, may apply equally to control of the third fluid spray bar, and control of the second fluid spray bar 124 by the second fluid pump 130, as described herein, may apply equally to control of the fourth fluid spray bar.

The first fluid pump 128 may be any suitable fluid pumping mechanism that is configured to draw, via a feed line 132, fluid from a first fluid reservoir 134, and supply the fluid (e.g., pressurized fluid), via a main line 136, to the first fluid spray bar 122. The second fluid pump 130 may be any suitable fluid pumping mechanism that is configured to draw, via a feed line 138, fluid from a second fluid reservoir 140, and supply the fluid (e.g., pressurized fluid), via a main line 142, to the second fluid spray bar 124. In some examples, the first fluid pump 128 and the second fluid pump 130 may draw fluid from a single, shared fluid reservoir. Although not depicted in FIG. 1, the first fluid pump 128, the second fluid pump 130, the first fluid reservoir 134, the second fluid reservoir 140, and/or lines 132, 136, 138, and 142 may be included in the machine 100.

The first fluid pump 128 and the second fluid pump 130 each are communicatively connected (e.g., by a wired connection or a wireless connection) to the controller 126. Thus, the controller 126 may transmit a signal to the first fluid pump 128 that causes activation of the first fluid pump 128 (e.g., causes the first fluid pump 128 to turn on, to pump fluid, or the like) or causes deactivation of the first fluid pump 128 (e.g., causes the first fluid pump 128 to turn off, to cease pumping fluid, or the like). Similarly, the controller 126 may transmit a signal to the second fluid pump 130 that causes activation of the second fluid pump 130 or causes deactivation of the second fluid pump 130.

The controller 126 may be configured to receive, from the fluid spray system control 112, an input (e.g., a signal) relating to the fluid spray system 200. The input may indicate a proportion of a spray cycle (e.g., from 0% to 100%) in which the fluid spray system 200 is to be active (e.g., a duty cycle for the fluid spray system 200). In other words, the input may indicate a proportion of a spray cycle in which the first fluid pump 128 and the second fluid pump 130 are to be active (e.g., in an on state). "Spray cycle" may refer to a repeating time interval in which a fluid pump has an active time and/or an inactive time. For example, for a spray cycle of 50 seconds, a fluid pump may have an active time of 30 seconds and an inactive time of 20 seconds. As another example, for a spray cycle of 50 seconds, a fluid pump may have an active time of 50 seconds and an inactive time of 0 seconds. As described above, an operator or other user of the machine 100 may set the proportion of the spray cycle (e.g., as a percentage) via the fluid spray system control 112 (e.g., by rotating a dial). In some examples, the proportion of the spray cycle in which the fluid spray system 200 is to be active may be less than an entirety (e.g., less than 100%) of the spray cycle in order to conserve fluid.

In some implementations, the controller 126 may determine (e.g., autonomously, without the input from the fluid spray system control 112) the proportion of the spray cycle in which the fluid spray system 200 is to be active (e.g., in which the first fluid pump 128 and the second fluid pump 130 are to be active). The controller 126 may determine the proportion of the spray cycle based on one or more sensor signals received by the controller 126 from one or more sensors (not shown) of the machine 100. The one or more sensor signals may indicate conditions in an environment of the machine 100, such as a temperature, a humidity, a dewpoint, a precipitation level, and/or a sunlight intensity, and/or may indicate conditions of the machine 100, such as a fluid level of the first fluid reservoir 134 and/or the second fluid reservoir 140, a temperature at the surface 102' of the compaction drum 102 and/or the surface 104' of the compaction drum 104, and/or a moisture level at the surface 102' of the compaction drum 102 and/or the surface 104' of the compaction drum 104. Based on the one or more sensor signals, the controller 126 may determine (e.g., using a machine learning model) the proportion of the spray cycle to minimize sticking of paving material to the compaction drums 102, 104 and/or to conserve fluid.

The controller 126 may be configured to determine, based on the proportion of the spray cycle in which the fluid spray system 200 is to be active, a spraying timing (e.g., a spraying configuration) for the first fluid pump 128 and the second fluid pump 130. Thus, the first fluid pump 128 may have an active time for the proportion of the spray cycle and the second fluid pump 130 may have an active time for the proportion of the spray cycle, and the spraying timing may indicate time locations in the spray cycle for the active time (and/or an inactive time) of the first fluid pump 128 and the active time (and/or an inactive time) of the second fluid pump 130.

The controller 126 may determine the spraying timing to minimize an overlap of an active time of the first fluid pump 128 and an active time of the second fluid pump 130 and/or minimize an overlap of an inactive time of the first fluid pump 128 and an inactive time of the second fluid pump 130. For example, the controller 126 may determine the spraying timing to both minimize an overlap of an active time of the first fluid pump 128 and an active time of the second fluid pump 130 and minimize an overlap of an inactive time of the first fluid pump 128 and an inactive time of the second fluid pump 130. In other words, the spraying timing may minimize an amount of time that the first fluid pump 128 and the second fluid pump 130 are active simultaneously and/or minimize an amount of time that the first fluid pump 128 and the second fluid pump 130 are inactive simultaneously.

According to the spraying timing, the active time of the first fluid pump 128 alternates with the active time of the second fluid pump 130 (e.g., with overlap of the active times, or without overlap of the active times, based on the proportion of the spray cycle, as described below). In some examples, according to the spraying timing, a midpoint of the active time of the first fluid pump 128 coincides (e.g., in time) with a midpoint of the inactive time of the second fluid pump 130, or stated differently, a midpoint of the active time of the second fluid pump 130 coincides with a midpoint of the inactive time of the first fluid pump 128. In this way, a series of alternating active times of the first fluid pump 128 and the second fluid pump 130 do not overlap or overlap evenly, and/or a series alternating inactive times of the first fluid pump 128 and the second fluid pump 130 do not overlap or overlap evenly, thereby minimizing an amount of time that the first fluid pump 128 and the second fluid pump 130 are active/inactive simultaneously.

The controller 126 may be configured to cause activation (e.g., pumping) of the first fluid pump 128 and the second fluid pump 130 in accordance with the spraying timing. For example, during the active time of the first fluid pump 128 according to the spraying timing, the controller 126 may cause activation of the first fluid pump 128, and during the inactive time of the first fluid pump 128 according to the spraying timing, the controller 126 may cause deactivation of the first fluid pump 128. Similarly, during the active time of the second fluid pump 128 according to the spraying timing, the controller 126 may cause activation of the second fluid pump 128, and during the inactive time of the second fluid pump 128 according to the spraying timing, the controller 126 may cause deactivation of the second fluid pump 128. The controller 126 may provide signals (e.g., pulse width modulation signals) to the fluid pumps 128, 130 to cause activation or deactivation of the fluid pumps 128, 130.

In this way, activation of the first fluid pump 128 and the second fluid pump 130, for the proportion of the spray cycle, in accordance with the spraying timing, causes the first fluid spray bar 122 and the second fluid spray bar 124 to spray (e.g., collectively) a first amount of fluid that is equivalent to a second amount of fluid that would be sprayed (e.g., collectively) by the first fluid spray bar 122 and the second fluid spray bar 124 if activation of the first fluid pump 128 and the second fluid pump 130, for the proportion of the spray cycle, were synchronized. That is, the spraying timing does not result in an increase of an overall amount of fluid that is sprayed during the spray cycle relative to synchronized spraying. Thus, if the proportion of the spray cycle is less than an entirety of the spray cycle (e.g., to achieve fluid conservation), the spraying timing does not frustrate the fluid conservation relative to synchronized spraying. However, activation of the first fluid pump 128 and the second fluid pump 130, for the proportion of the spray cycle, in accordance with the spraying timing, causes the first fluid spray bar 122 and the second fluid spray bar 124 to spray (e.g., collectively) fluid for a first duration of the spray cycle that is greater than a second duration of the spray cycle for which the first fluid spray bar 122 and the second fluid spray bar 124 would spray fluid if activation of the first fluid pump 128 and the second fluid pump 130, for the proportion of the spray cycle, were synchronized. That is, the spraying timing increases an overall amount of time of the spray cycle for which fluid is sprayed relative to synchronized spraying.

As indicated above, FIG. 2 is provided as an example. Other examples may differ from what is described in connection with FIG. 2.

Figure 3:
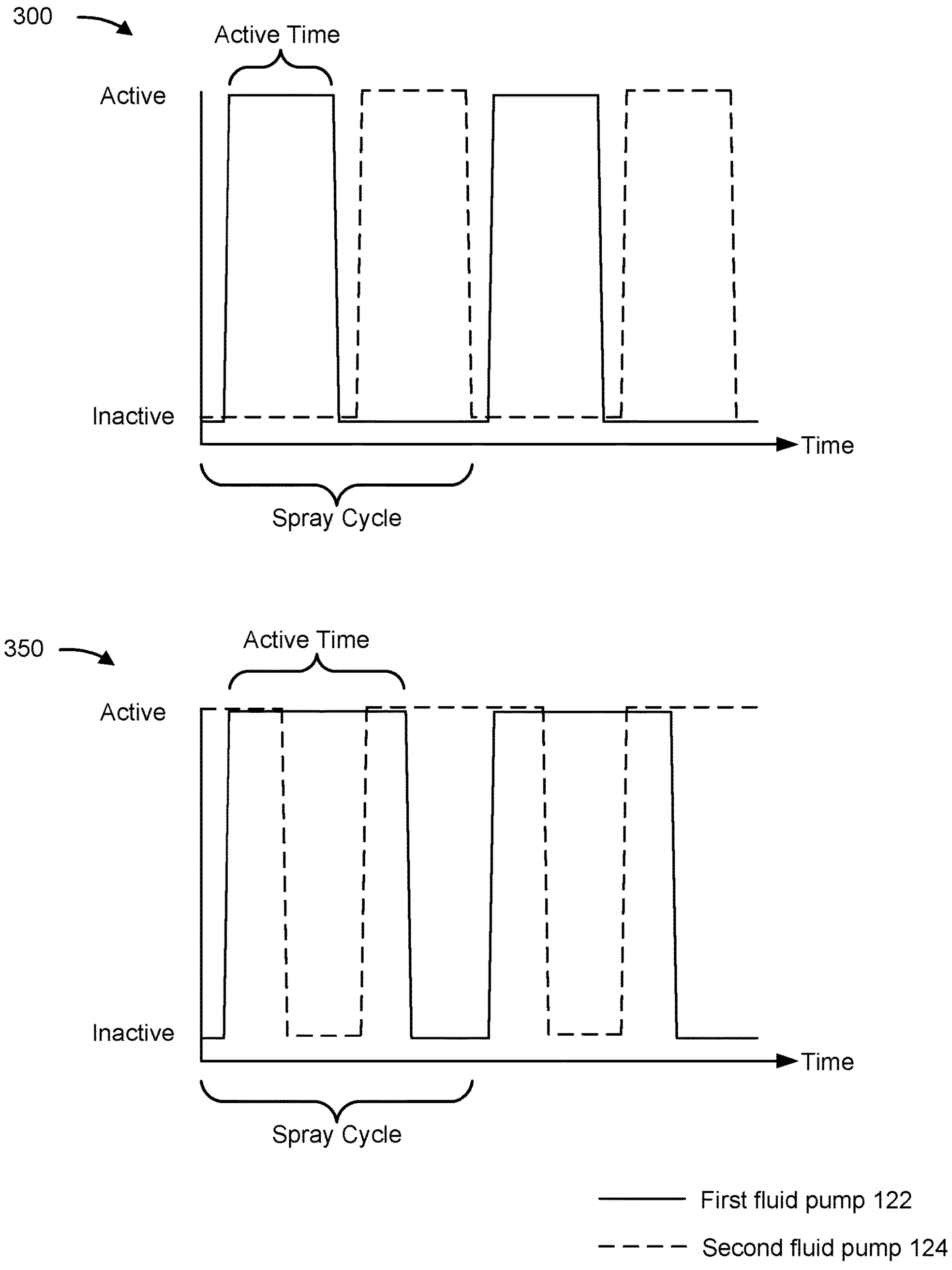
FIG. 3 is a diagram of examples of a spraying timing described herein.

FIG. 3 is a diagram of examples 300 and 350 of a spraying timing described herein. Examples 300 and 350 provide examples of a spraying timing that may be determined and applied by the controller 126, as described herein. Moreover, as described herein, a spraying timing may be based on an input or a determination of a proportion of a spray cycle for which the fluid spray system 200 is to be active (e.g., for which the first fluid pump 128 and the second fluid pump 130 are to be active).

In example 300, the first fluid pump 128 and the second fluid pump 130 are each active for 40% of a spray cycle. Thus, according to the spraying timing, the active time of the first fluid pump 128 and the active time of the second fluid pump 130 do not overlap. That is, according to the spraying timing, the active time of the first fluid pump 128 and the active time of the second fluid pump 130 do not overlap if the proportion of the spray cycle is less than or equal to half of the spray cycle. For example, if the spraying timing is determined such that a midpoint of the active time of the first fluid pump 128 coincides with a midpoint of the inactive time of the second fluid pump 130, as described above, then, according to the spraying timing, the active time of the first fluid pump 128 and the active time of the second fluid pump 130 do not overlap and an overlap of the inactive time of the first fluid pump 128 and the inactive time of the second fluid pump 130 is minimized.

In example 350, the first fluid pump 128 and the second fluid pump 130 are each active for 70% of a spray cycle. Thus, according to the spraying timing, the inactive time of the first fluid pump 128 and the inactive time of the second fluid pump 130 do not overlap. That is, according to the spraying timing, the inactive time of the first fluid pump 128 and the inactive time of the second fluid pump 130 do not overlap if the proportion of the spray cycle is greater than half of the spray cycle. For example, if the spraying timing is determined such that a midpoint of the active time of the first fluid pump 128 coincides with a midpoint of the inactive time of the second fluid pump 130, as described above, then, according to the spraying timing, the inactive time of the first fluid pump 128 and the inactive time of the second fluid pump 130 do not overlap and an overlap of the active time of the first fluid pump 128 and the active time of the second fluid pump 130 is minimized.

As indicated above, FIG. 3 is provided as an example. Other examples may differ from what is described in connection with FIG. 3.

Figure 4:
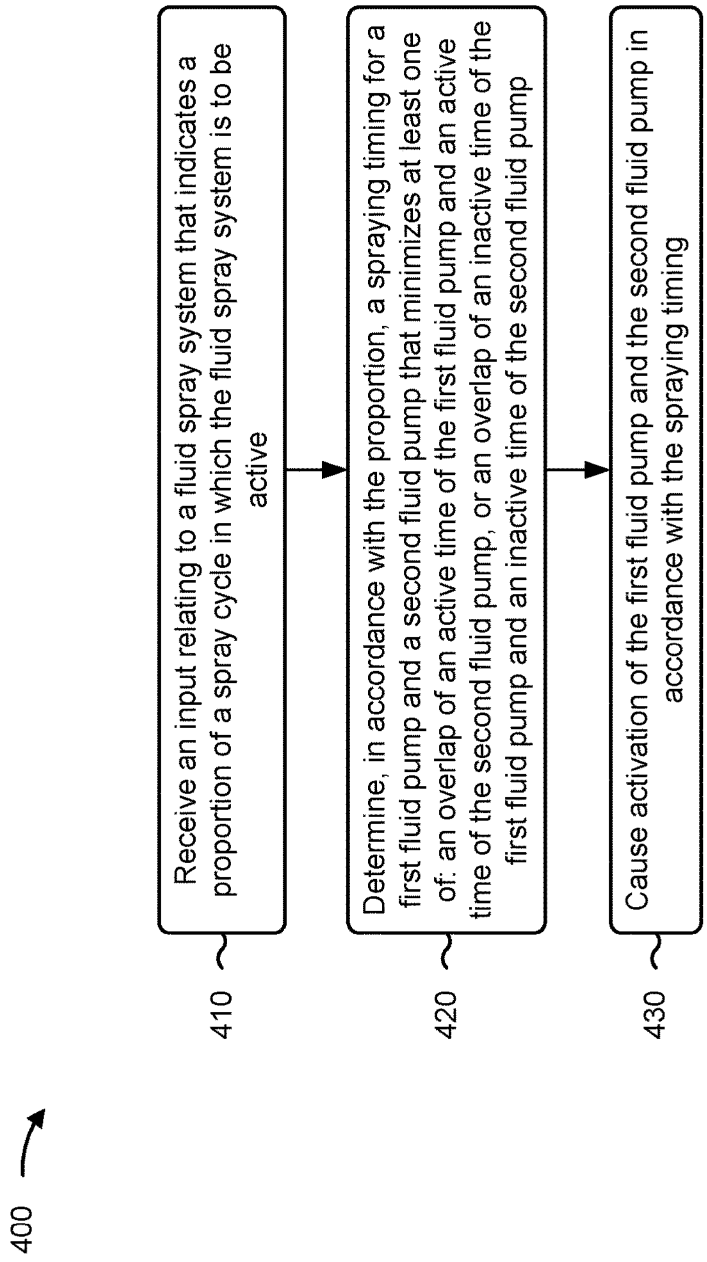
FIG. 4 is a flowchart of an example processes relating to fluid spray system timing control.

FIG. 4 is a flowchart of an example process 400 associated with fluid spray system timing control. In some implementations, one or more process blocks of FIG. 4 may be performed by a controller (e.g., controller 126). Additionally, or alternatively, one or more process blocks of FIG. 4 may be performed by another device or a group of devices separate from or including the controller, such as another device or component that is internal or external to the machine 100.

As shown in FIG. 4, process 400 may include receiving an input relating to a fluid spray system that indicates a proportion of a spray cycle in which the fluid spray system is to be active (block 410). For example, the controller (e.g., using a processor, a memory, an input component, and/or a communication interface) may receive an input relating to a fluid spray system that indicates a proportion of a spray cycle in which the fluid spray system is to be active. As described above, the fluid spray system may include at least a first fluid pump configured to supply fluid to a first fluid spray bar and a second fluid pump configured to supply fluid to a second fluid spray bar.

As further shown in FIG. 4, process 400 may include determining, in accordance with the proportion, a spraying timing for the first fluid pump and the second fluid pump that minimizes at least one of: an overlap of an active time of the first fluid pump and an active time of the second fluid pump, or an overlap of an inactive time of the first fluid pump and an inactive time of the second fluid pump (block 420). For example, the controller (e.g., using a processor and/or a memory) may determine, in accordance with the proportion, a spraying timing for the first fluid pump and the second fluid pump, as described above. The active time of the first fluid pump may be for the proportion of the spray cycle and the active time of the second fluid pump may be for the proportion of the spray cycle.

According to the spraying timing, the active time of the first fluid pump may alternate with the active time of the second fluid pump. According to the spraying timing, the active time of the first fluid pump and the active time of the second fluid pump may not overlap if the proportion is less than or equal to half of the spray cycle. According to the spraying timing, the inactive time of the first fluid pump and the inactive time of the second fluid pump may not overlap if the proportion is greater than half of the spray cycle. According to the spraying timing, a midpoint of the active time of the first fluid pump coincides with a midpoint of the inactive time of the second fluid pump.

As further shown in FIG. 4, process 400 may include causing activation of the first fluid pump and the second fluid pump in accordance with the spraying timing (block 430). For example, the controller (e.g., using a processor, a memory, an output component, and/or a communication interface) may cause activation of the first fluid pump and the second fluid pump in accordance with the spraying timing, as described above. Activation of the first fluid pump and the second fluid pump, for the proportion of the spray cycle, in accordance with the spraying timing, may spray a first amount of fluid that is equivalent to a second amount of fluid that would be sprayed if activation of the first fluid pump and the second fluid pump, for the proportion of the spray cycle, were synchronized. In addition, activation of the first fluid pump and the second fluid pump, for the proportion of the spray cycle, in accordance with the spraying timing, may spray fluid for a first duration of the spray cycle that is greater than a second duration of the spray cycle for which fluid would be sprayed if activation of the first fluid pump and the second fluid pump, for the proportion of the spray cycle, were synchronized.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

INDUSTRIAL APPLICABILITY

The fluid spray system described herein can be used with any machine that utilizes fluid spraying. For example, the fluid spray system can be used with a machine that includes a compaction member, such as a compaction drum, for compaction of soil, paving material, or the like. In particular, the fluid spray system is useful for controlling fluid pumps that separately control respective fluid spray bars that direct fluid at the compaction drum. For example, an inefficient spraying timing of the fluid pumps may result in periods of excessive fluid spraying on the compaction drum, which wastes fluid, and periods of inadequate fluid spraying on the compaction drum, which can lead to the compacted material sticking to the compaction drum and affecting compaction performance.

In some implementations described herein, a controller of the fluid spraying system may determine a spraying timing for multiple fluid pumps that minimizes an overlap of active times of the fluid pumps and/or minimizes an overlap of inactive times of the fluid pumps. In this way, an amount of time that the fluid pumps are active simultaneously or inactive simultaneously is minimized. The spraying timing is particularly useful when a proportion of a spray cycle for which the fluid pumps are to be active is less than an entirety of the spray cycle. When the proportion is less than the entirety of the spray cycle, the spraying timing may use a similar amount of fluid (e.g., may conserve a similar amount of fluid) as would be used for simultaneously spraying. However, the spraying timing provides spraying for a greater overall duration of the spray cycle relative to simultaneous spraying. Thus, the fluid spraying system described herein reduces sticking of material to a compaction drum, or other component, relative to simultaneous spraying. In this way, the fluid spraying system improves the efficiency and effectiveness of fluid usage.

What is claimed is:

1. A fluid spray system, comprising:
a first fluid spray bar configured to direct fluid at a compaction drum;
a second fluid spray bar overlapping the first fluid spray bar and configured to direct fluid at the compaction drum;
a first fluid pump configured to supply fluid to the first fluid spray bar;
a second fluid pump configured to supply fluid to the second fluid spray bar; and
a controller configured to:
determine a spraying timing for the first fluid pump and the second fluid pump that minimizes at least one of:
an overlap of an active time of the first fluid pump and an active time of the second fluid pump, or
an overlap of an inactive time of the first fluid pump and an inactive time of the second fluid pump; and
cause activation of the first fluid pump and the second fluid pump in accordance with the spraying timing.

2. The fluid spray system of claim 1, wherein the active time of the first fluid pump is for a proportion of a spray cycle in which the fluid spray system is to be active and the active time of the second fluid pump is for the proportion of the spray cycle.

3. The fluid spray system of claim 1, wherein, according to the spraying timing, the active time of the first fluid pump and the active time of the second fluid pump do not overlap.

4. The fluid spray system of claim 1, wherein, according to the spraying timing, the inactive time of the first fluid pump and the inactive time of the second fluid pump do not overlap.

5. The fluid spray system of claim 1, wherein, according to the spraying timing, a midpoint of the active time of the first fluid pump coincides with a midpoint of the inactive time of the second fluid pump.

6. The fluid spray system of claim 1, wherein the spraying timing minimizes both of:
the overlap of the active time of the first fluid pump and the active time of the second fluid pump, and
the overlap of the inactive time of the first fluid pump and the inactive time of the second fluid pump.

7. The fluid spray system of claim 1, wherein the spraying timing indicates time locations in a spray cycle for the active time of the first fluid pump and the active time of the second fluid pump.

8. The fluid spray system of claim 1, wherein the controller is further configured to:
determine, based on environmental conditions of the fluid spray system, a proportion of a spray cycle in which the fluid spray system is to be active,
wherein the environmental conditions include at least one of a temperature, a humidity, a dewpoint, a precipitation level, or a sunlight intensity of an environment of the fluid spray system; and
wherein the controller, when determining the spraying timing, is to determine the spraying timing based on the proportion of the spray cycle in which the fluid spray system is to be active.

9. A compactor machine, comprising:
a compaction drum;
a fluid spray system, comprising:
a first fluid spray bar configured to direct fluid at the compaction drum;
a second fluid spray bar overlapping the first fluid spray bar and configured to direct fluid at the compaction drum;
a first fluid pump configured to supply fluid to the first fluid spray bar; and
a second fluid pump configured to supply fluid to the second fluid spray bar; and
a controller configured to:
cause activation of the first fluid pump and the second fluid pump in accordance with a spraying timing that minimizes at least one of:
an overlap of an active time of the first fluid pump and an active time of the second fluid pump, or
an overlap of an inactive time of the first fluid pump and an inactive time of the second fluid pump.

10. The compactor machine of claim 9, wherein the controller is further configured to:
receive an input relating to the fluid spray system that indicates a proportion of a spray cycle in which the fluid spray system is to be active.

11. The compactor machine of claim 9, wherein the controller is further configured to:
determine, based on one or more sensor signals, a proportion of a spray cycle in which the fluid spray system is to be active.

12. The compactor machine of claim 9, wherein the controller is further configured to:
determine the spraying timing based on a proportion of a spray cycle in which the fluid spray system is to be active.

13. The compactor machine of claim 9, wherein, according to the spraying timing, a midpoint of the active time of the first fluid pump coincides with a midpoint of the inactive time of the second fluid pump.

14. A compactor machine, comprising:
a fluid spray system, comprising:
a first fluid spray bar configured to direct fluid at a compaction drum;
a second fluid spray bar overlapping the first fluid spray bar and configured to direct fluid at the compaction drum;
a first fluid pump configured to supply fluid to the first fluid spray bar; and
a second fluid pump configured to supply fluid to the second fluid spray bar; and
a controller configured to:
cause activation of the first fluid pump and the second fluid pump in accordance with a spraying timing that minimizes at least one of:
an overlap of an active time of the first fluid pump and an active time of the second fluid pump, or an overlap of an inactive time of the first fluid pump and an inactive time of the second fluid pump.

15. The compactor machine of claim 14, further comprising:

a first fluid reservoir configured to supply fluid to the first fluid pump and not the second fluid pump; and a second fluid reservoir configured to supply fluid to the second fluid pump and not the first fluid pump.

16. The compactor machine of claim 14, wherein the controller is further configured to:

determine, based on one or more sensor signals, a proportion of a spray cycle in which the fluid spray system is to be active.

17. The compactor machine of claim 14, wherein the controller is further configured to:

determine the spraying timing based on a proportion of a spray cycle in which the fluid spray system is to be active.

18. The compactor machine of claim 17, wherein, according to the spraying timing, the active time of the first fluid pump and the active time of the second fluid pump do not overlap if the proportion is less than or equal to half of the spray cycle.

19. The compactor machine of claim 14, wherein, according to the spraying timing, a midpoint of the active time of the first fluid pump coincides with a midpoint of the inactive time of the second fluid pump.

20. The compactor machine of claim 14, further comprising:

the compaction drum.

* * * * *